US011896912B2

(12) United States Patent
Smit

(10) Patent No.: US 11,896,912 B2
(45) Date of Patent: Feb. 13, 2024

(54) FRAME FOR A SIMULATOR

(71) Applicant: F. SMIT HOLDING B.V., Doetinchem (NL)

(72) Inventor: Fernando Smit, Doetinchem (NL)

(73) Assignee: F. SMIT HOLDING B.V., Doetinchem (NL)

( * ) Notice: Subject to any disclaimer, the term of this patent is extended or adjusted under 35 U.S.C. 154(b) by 167 days.

(21) Appl. No.: 17/437,119

(22) PCT Filed: Mar. 6, 2020

(86) PCT No.: PCT/NL2020/050151
§ 371 (c)(1),
(2) Date: Sep. 8, 2021

(87) PCT Pub. No.: WO2020/185072
PCT Pub. Date: Sep. 17, 2020

(65) Prior Publication Data
US 2022/0176257 A1 Jun. 9, 2022

(30) Foreign Application Priority Data
Mar. 8, 2019 (NL) ........................... 2022707

(51) Int. Cl.
*A63F 13/90* (2014.01)
*A63G 31/16* (2006.01)
(Continued)

(52) U.S. Cl.
CPC ............ *A63F 13/90* (2014.09); *A63F 13/245* (2014.09); *A63G 31/16* (2013.01); *A63F 13/803* (2014.09);
(Continued)

(58) Field of Classification Search
CPC ........ A63G 31/00; A63G 31/02; A63G 31/16; A63F 19/90; A63F 19/245; A63F 13/90;
(Continued)

(56) References Cited

U.S. PATENT DOCUMENTS

| D656,553 S | 3/2012 | Blaskov et al. |
| 2017/0113150 A1* | 4/2017 | Lee ......................... A63G 31/16 |
| 2019/0358536 A1* | 11/2019 | Van Beek ............... A63F 13/57 |

FOREIGN PATENT DOCUMENTS

| CN | 106457041 A | 2/2017 |
| DE | 29801415 U1 | 8/1998 |

(Continued)

OTHER PUBLICATIONS

International Search Report and Written Opinion for the International Patent Application No. PCT/NL2020/050151, dated May 28, 2020, 12 pages.
(Continued)

*Primary Examiner* — Kien T Nguyen
(74) *Attorney, Agent, or Firm* — KDW Firm PLLC

(57) ABSTRACT

A frame for a simulator includes a support for pedals, a support for a manual control unit and a support for a seat, and at least two elongate frame parts extending on either side of the supports and connected thereto. The support for the manual control unit and the seat support are displaceable in longitudinal direction of the frame. The support for the manual control unit and the seat support can here be displaceable in opposite directions in order to form a space therebetween. A simulator comprising such a frame, where a seat is mounted on the seat support, a manual control unit is mounted on the support for the manual control unit, and pedals are mounted on the pedal support.

22 Claims, 4 Drawing Sheets

Figure 1:
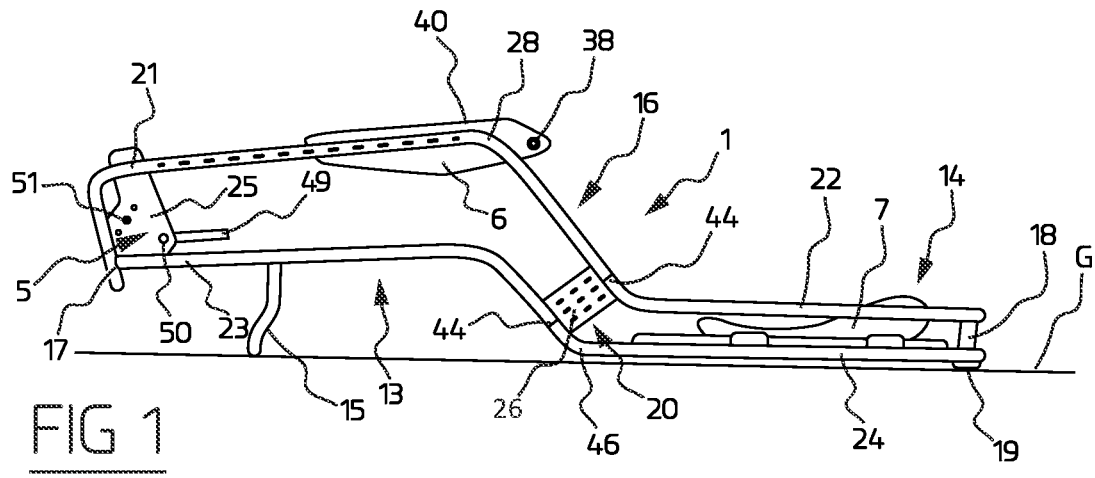

(51) Int. Cl.
*A63F 13/245* (2014.01)
*A63F 13/803* (2014.01)

(52) U.S. Cl.
CPC ............... *A63F 2300/1043* (2013.01); *A63F 2300/8017* (2013.01)

(58) Field of Classification Search
CPC ........... A63F 13/245; G09B 9/02; G09B 9/14; G09B 9/28
USPC ............................... 472/59–61, 130; 434/55
See application file for complete search history.

(56) References Cited

FOREIGN PATENT DOCUMENTS

| | | |
|---|---|---|
| EP | 2820976 A2 | 1/2015 |
| NL | 2018898 B1 | 7/2018 |

OTHER PUBLICATIONS

Inntemational Preliminary Report on Patentability for the International Patent Application No. PCT/NL2020/050151, dated Aug. 25, 2021, 7 pages.

* cited by examiner

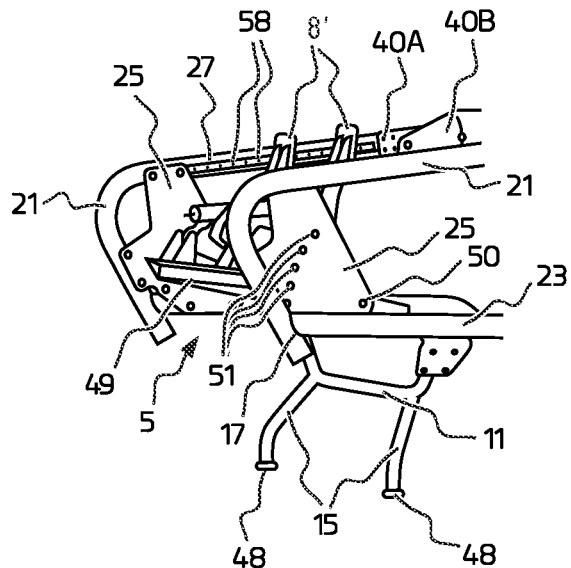
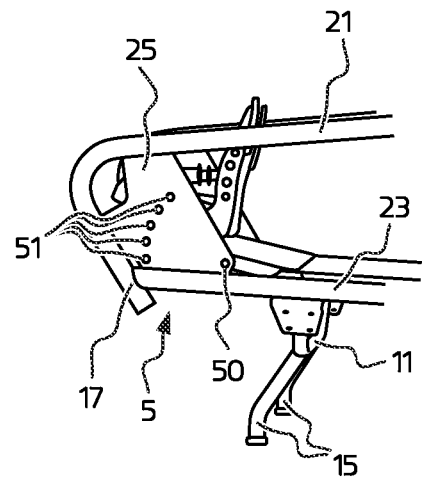
FIG 8
FIG 9
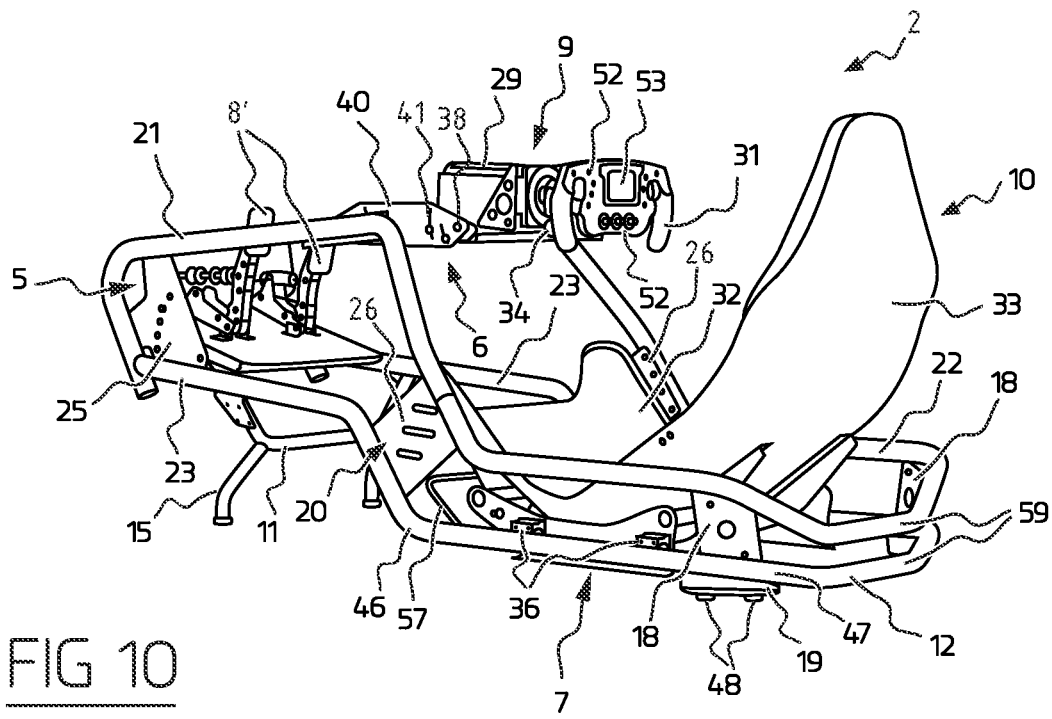
FIG 10

FRAME FOR A SIMULATOR

This is a national stage application filed under 35 U.S.C. § 371 of pending international application PCT/NL2020/050151, filed Mar. 6, 2020, which claims priority to Netherlands Patent Application No. NL 2022707, filed Mar. 8, 2019, the entirety of which applications are hereby incorporated by reference herein.

The invention relates to a frame for a simulator, particularly for a vehicle simulator such as a racing car simulator.

Simulators are known in different variants. For simulators intended for use by multiple people it is of great importance that they can be made suitable for the different users, wherein, irrespective of his or her build, each user can adopt a sitting posture which is realistic for the simulated activity. In addition, it is of great importance for such simulators that they can withstand intensive and prolonged use.

The invention has for its object to provide an improved frame for such a simulator. According to the invention, such a simulator frame comprises a support for pedals, a support for a manual control unit and a support for a seat, and at least two elongate and upright frame parts extending on either side of the supports and connected to each thereof, wherein the support for the manual control unit and the seat support are displaceable in longitudinal direction of the frame. By forming the frame on the basis of two or more elongate and upright (or vertically oriented) frame parts and a number of supports suspended therebetween a very robust frame is obtained. By furthermore giving both the support for the manual control unit and the seat support a displaceable form the simulator of which the frame forms part can be made suitable for use by people of varying builds, for instance both adults and children. The elongate and upright frame parts do not move and consequently provide support under all circumstances. The manual control unit can here otherwise comprise a steering wheel, optionally provided with paddle shifters, or one or more joysticks, depending on the purpose of the simulator.

When the support for the manual control unit and the seat support are displaceable in opposite directions in order to form a space therebetween when in their spaced apart end positions, a user can get into the simulator or get out of it again in relatively simple manner. For this purpose the user can first move the manual control unit and the seat apart, and then step into the intermediate space formed thereby. The user can then lower himself into the seat and extend his legs under the manual control unit and forward toward the pedals.

When the support for the manual control unit and the seat support are displaceable such that when moved fully together a manual control unit mounted on the relevant support extends above a seat mounted on the seat support, a user, once seated in the simulator, can pull the manual control unit, i.e. the steering wheel or the joystick, all the way back toward himself for an optimal control over the simulator. The user can thus take up a sitting posture which is realistic for the simulated activity, so for racing in a formula car or flying in a fighter plane. To this end the user may move either the support for the manual control unit, the seat support or both supports together within the frame.

The support for the manual control unit and the seat support can be slidable substantially horizontally in the frame. The manual control unit and the seat can thus be placed in the correct position quickly and easily. Owing to the horizontal slidability, the relative orientation of the different components does not change when they are moved toward each other or apart.

The support for the manual control unit and the seat support can be slidable over guides incorporated in the elongate and upright frame parts on either side of the support. The elongate and upright frame parts are thus not just for strength, but also fulfil a function in the adjustability of the different components.

The support for the manual control unit and the seat support can be fixable in different positions in longitudinal direction of the frame. After a desired position has been adjusted, the components can thus be secured in that position. There can be a number of discrete positions, for instance determined by a toothing or a pin/hole system, but use can also be made for the fixing of a clamping system, whereby the different components can be secured at random positions.

The support for the manual control unit can in any case be adjustable in height direction of the frame. The manual control unit can thus be placed at a height optimal for a user.

In addition or instead, an angle of inclination of the support for the manual control unit can be adjustable. By adjusting the angle at which the manual control unit is placed relative to the horizontal displacement direction the sitting position for users of varying builds can be optimised further, whereby the experience is improved.

The pedal support can be mounted at a fixed position in the frame. Because the pedals will often be pressed with great force, particularly when playing racing games, it is important for this pedal support to be mounted fixedly in the frame so as to be able to properly absorb and transmit the forces exerted on the pedals.

For an optimal situation of a racing car the supports can be positioned in the frame such that a seat surface of a seat mounted on the seat support lies substantially at the same height above a ground surface as pedals mounted on the pedal support, and an upper part of a backrest of the seat mounted on the seat support lies substantially at the same height as a manual control unit mounted on the relevant support. The reclining posture which is typical for driving a formula car is thus simulated. This posture is otherwise also suitable for simulating fighter planes.

The seat support can here be configured to mount the seat thereon in rearward tilted position.

The frame can comprise a front part in which the pedal support and the support for the manual control unit are incorporated, and a rear part in which the seat support is incorporated. The seat support on one side and the pedal support and support for the manual control unit on the other can thus be functionally and structurally separated from each other.

In order to be able to transport the frame in simple manner the front and rear frame parts can be connected releasably to each other. By taking these parts apart they can be transported separately, which makes them easier to handle than the frame as a whole. However, once connected the frame parts are not moveable and form a rigid frame.

For an optimal strength and rigidity of the frame the front and rear parts can be fastened to each other by means of biased fastening elements. The fastening elements can here be arranged both internally and externally.

The front frame part can lie higher above the ground than the rear frame part, so that the pedals lie relatively high relative to the seat, and a user thus indeed adopts a desired reclining posture.

The frame can further comprise an inclining connecting segment between the front and rear frame part. This inclining segment allows loads to be transmitted properly from the higher-lying front part to the lower-lying rear part and vice versa. In addition, the inclining segment of the frame can also function as a handle to make getting in and out easier. When the front and rear frame part are fastened releasably to each other, the division and the associated fastening can be formed in the inclining connecting segment.

The elongate and upright frame parts running on either side of the supports can be mutually connected close to their ends by transverse frame parts. A closed frame is thus formed, which gives the simulator a high degree of rigidity and strength. The rear transverse frame part extends behind the seat support in order not to impede its longitudinal displacement.

An effective construction is obtained here when the frame parts comprise tubular elements. As a result of their closed cross-sectional form, such tubular elements are relatively strong and rigid at a relatively low weight.

For an optimal rigidity, particularly against warping of the frame when the pedals are pressed with force, at least several frame parts can be formed by two or more tubular elements placed substantially parallel one above the other. The frame hereby takes as it were a form with double, triple or still greater strength. The upper tubular element of the rear transverse frame part may be lowered in order to provide room for the back of the seat.

The frame can here further be provided with stiffening elements which mutually connect the tubular elements placed one above the other, whereby the tubular elements can collectively absorb and distribute the loads acting on the frame. When the frame consists of releasable front and rear frame parts, the fastening elements between these frame parts can also function as stiffening elements.

At least some of the stiffening elements can be provided with legs for supporting on the ground, so that loads acting on the frame can be transmitted directly into the ground.

In this embodiment the guides can comprise rails mounted on the tubular elements. The guiding function is thus disconnected from the stiffening function of the tubes, this reducing the risk of the displaceable supports becoming jammed.

The invention further relates to a simulator provided with a frame of the above described type. A seat is here mounted on the seat support of the frame, a manual control unit is mounted on the support for the manual control unit, and pedals are mounted on the pedal support.

In a further embodiment the simulator further comprises at least one screen, which is preferably placed substantially in line with the manual control unit, as seen from a seat. It is otherwise possible to envisage additional screens also being placed on either side of this centrally placed screen for the purpose of providing the most lifelike experience possible.

Figure 2:
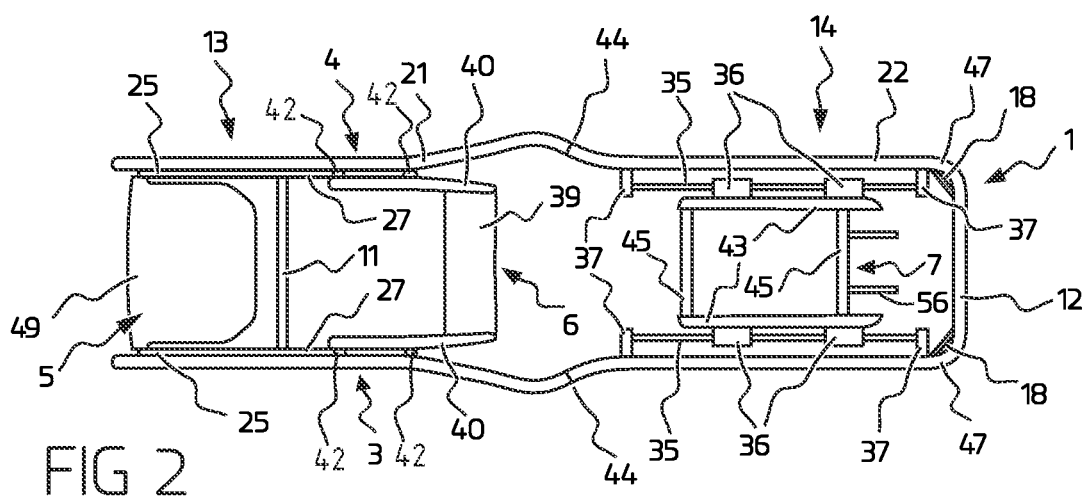
Figure 3:
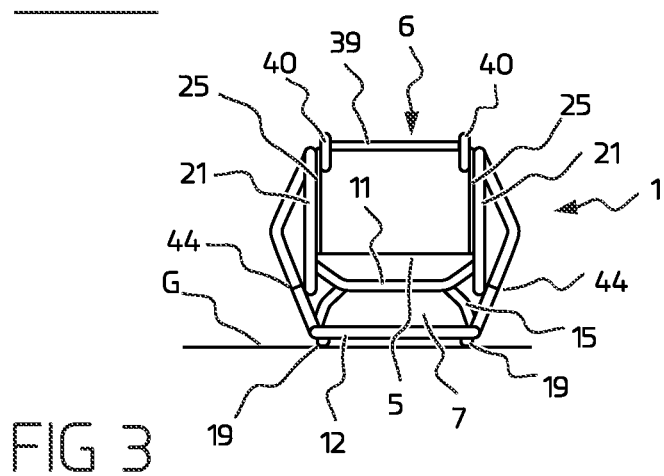
Figure 4:
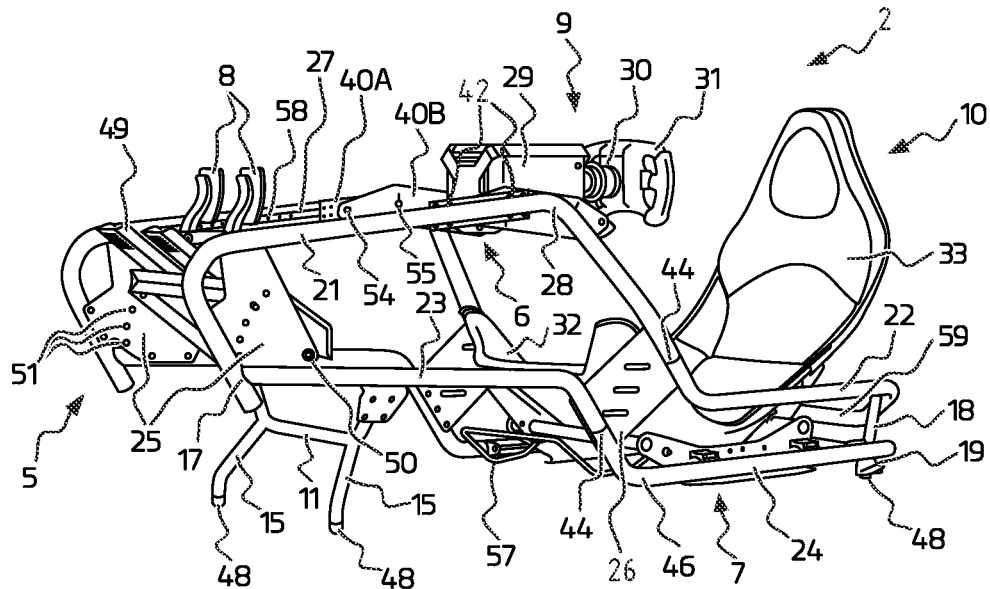
Figure 5:
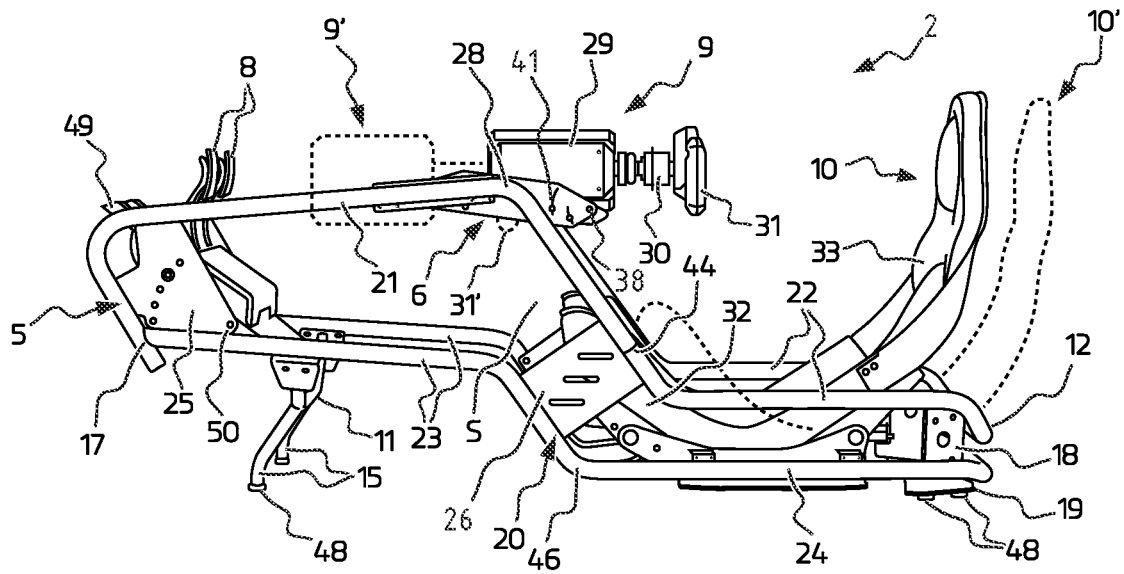
Figure 6:
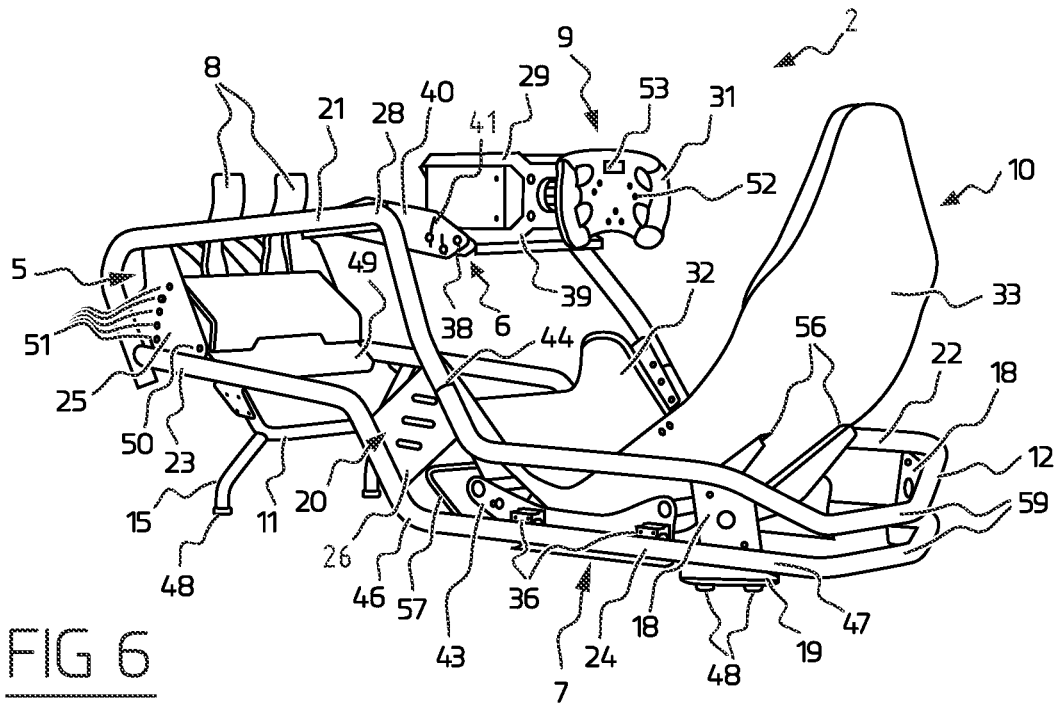
Figure 7:
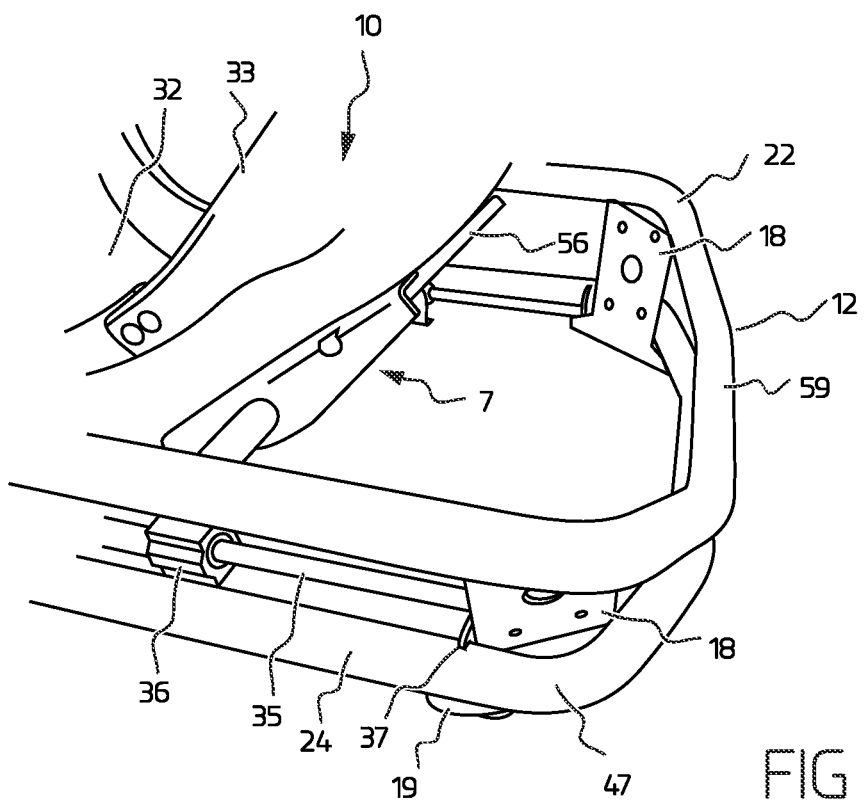

The invention is elucidated hereinbelow on the basis of an embodiment, wherein reference is made to the annexed drawing, in which:

FIG. 1 is a side view of a frame for a simulator according to an embodiment of the invention, FIG. 2 is a top view of the frame of FIG. 1, FIG. 3 is a front view of the frame of FIGS. 1 and 2, FIG. 4 is a perspective front view of a simulator on the basis of the frame of FIG. 1-3, with a seat, pedals and a manual control unit, FIG. 5 is a side view of the simulator of FIG. 4 which shows different positions of the manual control unit and the seat, FIG. 6 is a perspective rear view of the simulator of FIGS. 4 and 5, FIG. 7 is a perspective detail view of a guide for the seat support, FIG. 8 is a perspective detail view of the pedal support in a different position than in FIG. 4-6, when the simulator is provided with different pedals, FIG. 9 is a side view of the pedal support and the pedals of FIG. 8, and FIG. 10 is a view corresponding with FIG. 6 of the simulator with the pedals of FIGS. 8 and 9 and a different manual control unit.

A frame 1 for a simulator 2 comprises two elongate and upright side parts 3, 4 and three supports 5, 6, 7 arranged therebetween. The side parts 3, 4 are rigid and non-movable. Front support 5 is mounted non-movably on side parts 3, 4 and forms a support for pedals 8. A middle support 6 is movable in longitudinal direction of frame 1 and forms a support for a manual control unit 9. Rear support 7 is likewise movable in longitudinal direction of frame 1 and forms a support for a seat 10.

In the shown embodiment frame 1 is further provided with transverse frame parts 11, 12 which connect the elongate side parts 3, 4 to each other close to their front and rear outer ends. Rear transverse frame part 12 extends behind the seat support 7. Frame 1 further has a front frame part 13 which carries the pedal support 5 and the support 6 for the manual control unit, and a rear frame part 14 which carries the seat support 7. Front frame part 13 lies higher above a ground surface G than rear frame part 14. At the position of front transverse part 11 frame 1 is therefore provided with two legs 15 with which front frame part 13 supports on the ground G. Between front frame part 13 and the lower-lying rear frame part 14 the frame has an inclining connecting segment 16.

In the shown embodiment frame 1 is constructed from tubular elements which are bent in suitable manner so as to obtain the desired shape of frame 1. The elongate side parts 3, 4 of the frame are here in each case constructed from two substantially parallel tubular elements, respectively 21, 22 and 23, 24, placed one above the other, whereby side parts 3, 4 have a certain height and can withstand deformation. The respective upper and lower tubular elements 21, 22 and 23, 24 are welded together on the front side of frame 1, at front end 17 of lower tube 23, and in addition connected to each other by pedal support 5. In the rear part 14 of frame 1 the upper and lower tube 22, 24 are connected to each other by welded stiffening elements 18 which are provided on their underside with legs 19. Just as the front legs 15, these rear legs 19 are provided with rubber caps 48.

In the shown embodiment front and rear frame parts 13, 14 are connected releasably to each other. Arranged for this purpose on either side of frame 1 are fastening members 20, these in each case connecting the two upper tubular elements 21, 22 and the two lower tubular elements 23, 24 to each other and thus bridging a division 44 in frame 1. Frame 1 is easy to transport or store by dividing it into two mutually releasable frame parts 13, 14. Fastening members 20 are configured to mutually connect frame parts 13, 14 under bias. Each fastening member 20 comprises for this purpose a plate 26 with curves or bends (in FIG. 1 the bending lines are shown in broken lines), which are fastened by means of bolts to two counter-members with internal screw thread, which are arranged inside the upper and lower tubular elements 21-24. Holes (not shown here) are for this purpose formed in the tubular elements 21-24.

As stated, pedal support 5 is mounted non-movably in frame 1. In the shown embodiment pedal support 5 has two side walls 25 which are mounted by means of a screw connection on the adjacent tubular element 21, 23 and between which a plate 49 is mounted for pivoting about a shaft 50. A front end of plate 49 can be fixed by means of pins in different positions in holes 51 in the side walls, whereby the angle of inclination of plate 49 can be adjusted in accordance with the length and angle of inclination of the set of pedals 8 of a determined simulator. FIG. 4-6 show that in the case of a first type of pedal 8 plate 49 is positioned obliquely upward, wherein the pins are placed in the upper holes 51, while FIG. 8-10 show plate 49 of pedal support 5 in a flatter position, wherein the pins are placed in a lower-lying pair of holes 51, corresponding to a second type of pedal 8'.

As stated, the support 6 for manual control unit 9 is displaceable in longitudinal direction of frame 1. In the shown embodiment two guide rails 27, along which support 6 for manual control unit 9 is slidable, are for this purpose welded on the inner side of the upper tubular elements 21. These rails 27 extend rearward substantially from pedal support 5, up to a bend 28 in tubular elements 21 which forms the transition from front frame part 13 to inclining part 16. Support 6 is slidable along guide rails 27 by means of bearings 42 which are arranged on spacers 40, between which a carrier 39 for manual control unit 9 is arranged. Support 6 can be fixed in a desired position by means of pins (not shown here) in spacers 40, which can be placed in holes 58 in rails 27.

Carrier 39 is mounted between spacers 40 for pivoting about a shaft 38. A fixing mechanism 41 in the form of a clamping screw movable in a slot ensures that manual control unit 9 can be fixed in the adjusted position. In the shown embodiment spacers 40 otherwise also take a two-part form, with an outer part 40A which is slidable along guide rails 27 and an inner part 40B which is pivotable relative to the outer part about a shaft 54 and can be secured by a similar fixing mechanism 55 in the form of a clamping screw movable in a slot. Manual control unit 9 can thus be placed very accurately in a desired position in respect of height and angle, and fixed.

In the shown embodiment the manual control unit 9 is otherwise formed by a housing 29 on which a hub 30 and a steering wheel 31 can be fixedly snapped. The steering wheel can be a replica of the steering wheel of a formula car, with various adjusting buttons 52 and display elements, for instance lights or a display 53. The manual control unit can further be provided with paddle shifters 34 behind steering wheel 31.

As stated, seat support 7 is also displaceable in longitudinal direction of frame 1. Seat support 7 has for this purpose bearings 36 on either side, which are slidable along guide rails 35 which are welded by means of spacers 37 to the inner side of the bottom tubular element 24 in rear frame part 14. Bearings 36 are mounted on wings 43 of seat support 7, which are connected to each other by a number of transverse rods 45. Two rearward protruding backrest supports 56 are also mounted on rear transverse rod 45. Seat support 7 can be fixated in a desired position by means of a locking mechanism 57. Guide rails 35 here once again extend over substantially the whole length of rear frame part 14, from a bend 46 in the lower tubular element 24 which forms the transition from the rear frame part 14 to the inclining frame part 16, to a position close to a bend 47 which forms the transition between the part of the tubular element 24 which forms part of the side part 3, 4 and the part of this same tubular element 24 which forms the rear transverse frame part 12.

In the shown embodiment seat 10 is mounted on seat support 7 in a rearward tilted position. Both a seat surface 32 and a backrest 33 of seat 10 thereby extend at an acute angle to the ground G. This inclining position, in combination with the fact that the front frame part 13 with the pedal support 5 and the support 6 for manual control unit 9 therein lies higher above the ground G than the rear frame part 14 with seat support 7 therein, results in a user adopting a substantially reclining posture in simulator 2. This reclining posture is highly realistic for simulating racing in a formula car, but also for flying in a fighter plane. Seat surface 32 of seat 10 is thus situated substantially at the same height as pedal support 5 and pedals 18, while an upper part of backrest 33 lies substantially at the same height as manual control unit 9. In order also to create sufficient space for backrest 33 when seat 10 is in a position in which it has been slid rearward, a middle segment 59 of the tubular elements 22, 24 forming the rear transverse part 12 of frame 1 takes a lowered form.

Because both support 6 for manual control unit 9 and seat support 7 are slidable in frame 1 over relatively great lengths, the getting in and out can on the one hand be simplified, while every user can in addition easily find a suitable position for use of simulator 2. In the case of real formula cars the getting in and out is simplified by detaching the steering wheel. For a simulator which has to be used frequently and by different people, this is not practical. It must be remembered here that steering wheel 31 must be connected to housing 21 not just mechanically, but also electrically, this because of the different functions incorporated in steering wheel 31. A large number of electrical connectors is thus present between steering wheel 31 and housing 29, and frequent detaching and replacing of steering wheel 31 could result in wear, damage and poor contacts.

By now unlocking support 6 and sliding it forward as far as possible over guide rails 27 to the front end position shown in broken lines in FIG. 5, and simultaneously unlocking seat support 7 and sliding it rearward as far as possible over guide rails 35 to the rear end position likewise shown in broken lines, a space S in which a user can stand is formed between steering wheel 31 and seat surface 32 of seat 10. The user can here support with his hands on the tubular elements of the inclining middle segment 16 of frame 1. The user can then lower himself into seat 10 and extend his or her legs under support 6 and toward pedal support 5.

In order to create sufficient space in front frame half 13 for the legs of the user the front transverse frame part 11 is also bent to form a dip. At the same time, the bends in front frame part 11 form a suitable point for transmitting the loads from legs 15.

Once a user is seated in simulator 2, support 6 can be moved rearward again until steering wheel 31 is at a desired position in longitudinal direction of frame 1. Simultaneously, seat 7 can be moved forward so that the user ends up sufficiently close to steering wheel 31. Steering wheel 31 is then positioned roughly at the position of a transition between seat surface 32 and backrest 33 of the seat, which is a realistic position for a formula car. Supports 6, 7 can then be fixed by means of their locking mechanisms 57, 58, after which the user can use simulator 2.

Although the figures show only the frame and the different components of the simulator mounted therein, it will be apparent that the simulator will additionally comprise one or more screens on which the situations from a game, for instance a racing game or a flight simulator, will be shown. At least one of the screens will be placed substantially in line with steering wheel 31, as seen from seat 10. This screen can be mounted on frame 1, or be placed in front or over it. In the case of more advanced simulators, additional screens will also be provided on the sides, in addition to a central screen.

The invention thus provides a frame for a simulator in which a very lifelike experience is provided, while the frame is sufficiently robust for frequent use and the displaceable arrangement of the different components makes it possible to get in and out easily.

Although the invention has been described by reference to a specific embodiment thereof, i twill be clear that the invention is not limited thereto, but may be varied in many ways. For instance, the side parts 3, 4 of the frame 1 could be made from (possibly strengthened) sheet material, rather than as tubular frames. The rear transverse frame part 12 could be made from (strengthened) sheet material as well. All parts of the frame 1 may be made from a metal, e.g. steel or aluminum, or from a plastic material, in particular one or more fibre reinforced plastics. Moreover frame 1, which is here shown to be separable, could be made in one piece, if transport and/or temporary storage is not an issue. On the other hand, frame 1 may also be separable in more than two locations. Furthermore, support 6 for the manual control unit and/or seat support 7 could be displaceable along a single centrally located guide, instead of or in addition to the pair of guides at the sides of frame 1.

Consequently, the scope of the invention is defined solely by the following claims.

The invention claimed is:

1. A frame for a simulator, comprising:
a support for pedals,
a support for a manual control unit,
a support for a seat, and
at least two elongate and upright frame parts extending on either side of all of the supports and connected thereto,
wherein the support for the manual control unit and the seat support are displaceable in a longitudinal direction of the frame;
wherein the frame parts comprise tubular elements;
wherein at least several frame parts are formed by a plurality of tubular elements placed substantially parallel one above the other; and
wherein the frame is further provided with stiffening elements mutually connecting the tubular elements placed one above the other.

2. The frame according to claim 1, wherein the support for the manual control unit and the seat support are displaceable in opposite directions in order to form a space therebetween when in their spaced apart positions.

3. The frame according to claim 1, wherein the support for the manual control unit and the seat support are displaceable such that when moved together a manual control unit mounted on the relevant support extends above a seat mounted on the seat support.

4. The frame according to claim 1, wherein the support for the manual control unit and the seat support are slidable substantially horizontally in the frame.

5. The frame according to claim 4, wherein the support for the manual control unit and the seat support are slidable over guides incorporated in the elongate and upright frame parts on either side of all of the supports.

6. The frame according to claim 5, wherein the frame parts comprise tubular elements, and wherein the guides comprise rails mounted on the tubular elements.

7. The frame according to claim 1, wherein the support for the manual control unit and the seat support are fixable in different positions in longitudinal direction of the frame.

8. The frame according to claim 1, wherein at least the support for the manual control unit is adjustable in height direction of the frame.

9. The frame according to claim 1, wherein an angle of inclination of the support for the manual control unit is adjustable.

10. The frame according to claim 1, wherein the pedal support is mounted at a fixed position in the frame.

11. (Currently Amnded) The frame according to claim 1, wherein all of the supports are positioned in the frame such that a seat surface of a seat mounted on the seat support lies substantially at the same height above a ground surface as pedals mounted on the pedal support, and an upper part of a backrest of the seat mounted on the seat support lies substantially at the same height as a manual control unit mounted on the relevant support.

12. The frame according to claim 11, wherein the seat support is configured to mount the seat thereon in rearward tilted position.

13. The frame according to claim 1, wherein the frame comprises a front part in which the pedal support and the support for the manual control unit are incorporated, and a rear part in which the seat support is incorporated.

14. The frame according to claim 13, wherein the front and rear frame parts are connected releasably to each other.

15. The frame according to claim 14, wherein the front and rear parts are fastened to each other by means of biased fastening elements.

16. The frame according to claim 13, wherein the front frame part lies higher above the ground than the rear frame part.

17. The frame according to claim 16, further comprising an inclining connecting segment between the front and rear frame part.

18. The frame according to claim 1, wherein the elongate and upright frame parts running on either side of all of the supports are mutually connected close to their ends by transverse frame parts.

19. The frame according to claim 18, wherein the frame parts comprise tubular elements, wherein at least several frame parts are formed by a plurality of tubular elements placed substantially parallel one above the other, and wherein an upper tubular element of the rear transverse frame part is lowered near its centre.

20. The frame according to claim 1, wherein at least some of the stiffening elements are provided with legs for supporting on the ground.

21. A simulator comprising a frame according to claim 1, wherein a seat is mounted on the seat support, a manual control unit is mounted on the support for the manual control unit, and pedals are mounted on the pedal support.

22. The simulator according to claim 21, further comprising at least one screen, which is placed substantially in line with the manual control unit, as seen from the seat.

* * * * *